United States Patent [19]
Milankov et al.

[11] 3,814,197
[45] June 4, 1974

[54] ICE VEHICLE

[76] Inventors: Miloje Milankov, 237 Harvie Ave., 341, Toronto, Ontario; Dimitrije Milankov, 5 Harvard St., Toronto, Ontario, both of Canada

[22] Filed: Jan. 5, 1973

[21] Appl. No.: 321,367

[52] U.S. Cl.................... 180/3 R, 115/1 R, 280/16
[51] Int. Cl............................................. B62m 27/02
[58] Field of Search......... 180/3 R; 280/16; 115/1 R

[56] References Cited
UNITED STATES PATENTS

| 167,627 | 9/1875 | Story................................. 280/16 X |
| 429,265 | 6/1890 | Fendel................................ 280/16 |
| 529,494 | 11/1894 | Holt.................................. 280/16 |
| 1,363,071 | 12/1920 | Williams............................ 180/3 R |
| 1,909,233 | 5/1933 | Sovik................................. 280/16 |
| 2,528,397 | 10/1950 | Stof.................................... 280/16 |
| 3,057,633 | 10/1962 | Brousseau........................... 280/16 |
| 3,109,665 | 11/1963 | Remmen............................. 280/16 |

FOREIGN PATENTS OR APPLICATIONS

| 11,401 | 5/1911 | Great Britain....................... 280/16 |
| 810,816 | 1/1937 | France................................ 180/3 R |

OTHER PUBLICATIONS

German Printed Pat. Application No., 1,927,405 dated Dec. 3, 1970 to James A. Nelson, Motorized Sledge, Pamphlet – "The Aero–Sled"; – Mfr.: The Aero–Sled Co., Chicago, Illinois.

*Primary Examiner*—Leo Friaglia

[57] ABSTRACT

A motor driven ice vehicle capable of being dismantled for transportation, in which a motor is disengagable mounted on a carriage which has collapsible sides and a removable shaft projects forwardly from the carriage with a pivotal guide runner and a pair of foot rests for steering. Preferably the foot rests are mounted for universal pivotal movement on the guide runner.

11 Claims, 4 Drawing Figures

ICE VEHICLE

This invention relates to an ice vehicle.

Ice boats are well known in which a carriage is mounted on runners and driven by a propeller mounted on the carriage. Such vehicles are usually steered by a hand operated linkage mechanism. Also, they are not easily portable because of their size.

It is an object of the present invention to provide an ice vehicle steerable by foot operated means.

It is a further object of the invention to provide an ice vehicle which is collapsible for improved portability.

An example embodiment of the invention is shown in the accompanying drawings in which.

Figures 1, 4:
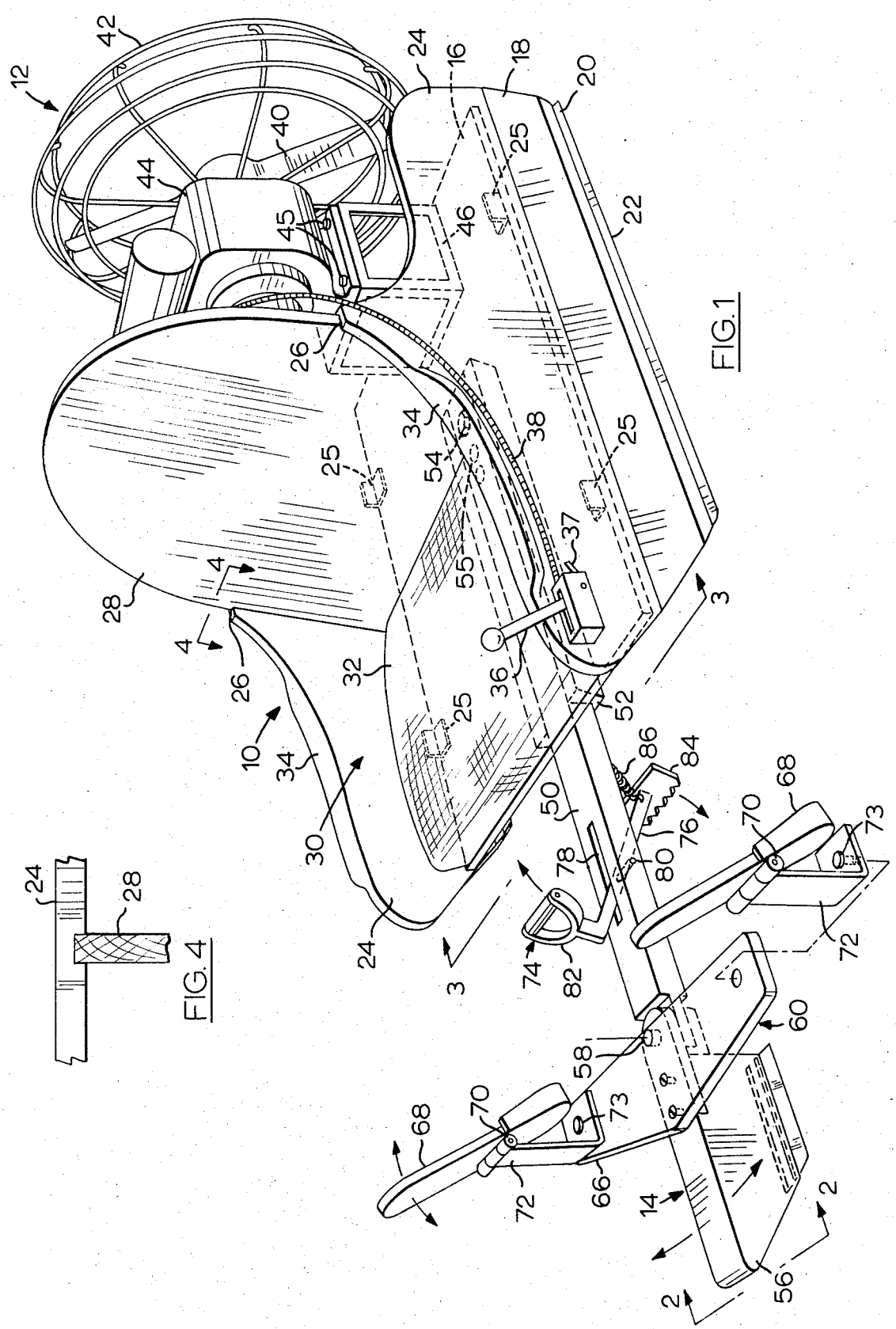
FIG. 1 is a perspective view of an ice vehicle.
FIG. 4 is a view taken along line 4—4 of FIG. 1.

The example embodiment shown in the drawings consists of a carriage 10 with a motor driven propeller unit 12 mounted on the carriage and steering means 14 extending forwardly from the carriage.

Figure 2:
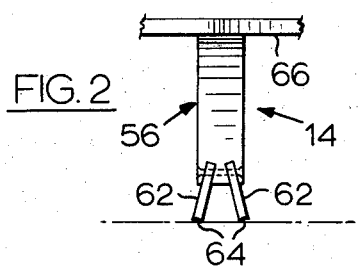
FIG. 2 is a view taken along line 2—2 of FIG. 1.
Figure 3:
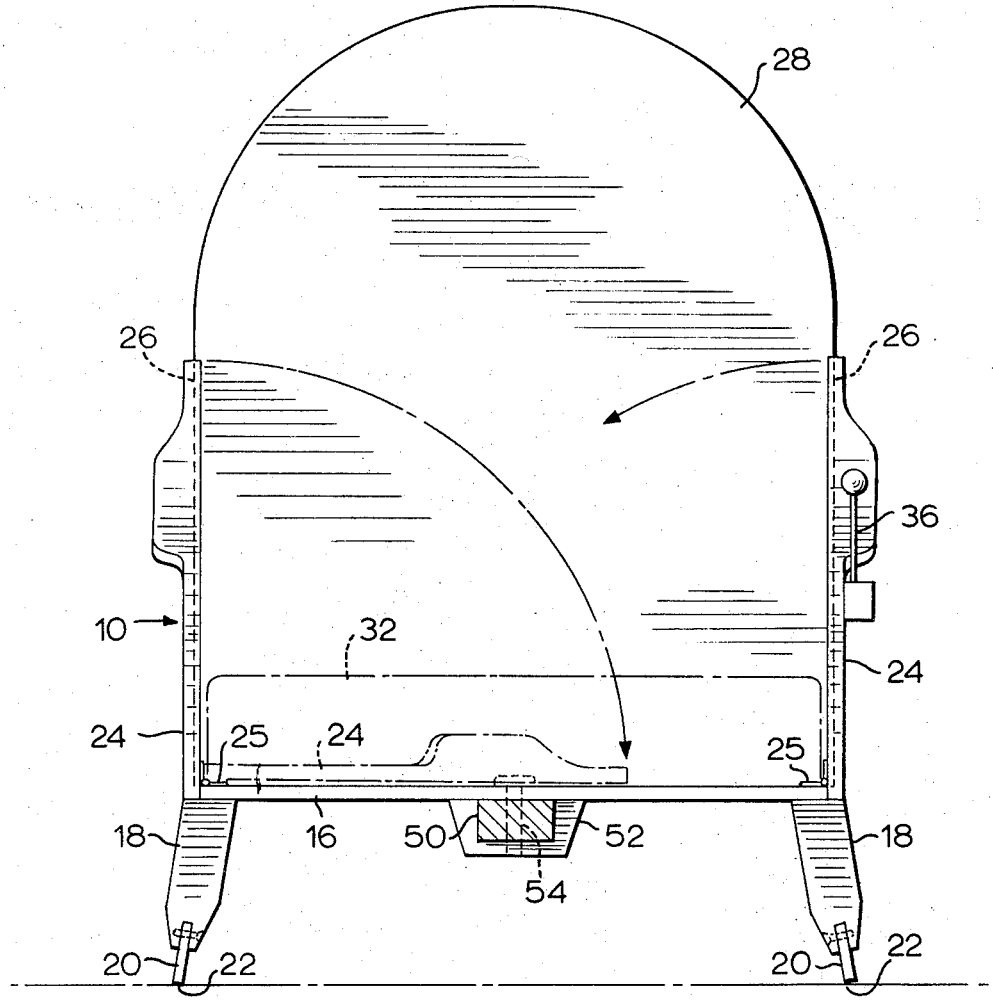
FIG. 3 is a view taken along line 3—3 of FIG. 1.

Carriage 10 comprises a horizontal deck 16 with a pair of runners 18 attached to the underside of the deck along each lateral edge of the deck. Runners 18 carry outwardly diverging blades 20, the running edge 22 of the blade being laterally concave, as seen in FIG. 2. A pair of side walls 24 are mounted on hinges 25 each of the two side edges of deck 16, to fold inwardly onto the deck as seen in FIG. 3. The central portion of each side wall 24 has a downwardly extending groove 26 which is engaged by the side edges of an upstanding back rest 28 when the side walls are in an upright position, as seen particularly in FIG. 4. Side walls 24 and back rest 28 define a seat 30 which may carry a removable cushion 32. Side walls 24 include arm rests 34 and one side wall carries a control lever 36 and an on-off switch 37 for operating propeller unit 12 through a detachable cable 38. Propeller unit 12 comprises a propeller 40 enclosed in a cage 42 and driven by a motor 44 which is detachably mounted by bolts 45 on a stand 46 fixed on deck 16 of carriage 10 behind back rest 28.

Steering means 14 comprises a shaft 50 projecting forwardly from carriage 10 and removably attached to the underside of platform 16 in a fixed channel 52 by a bolt 54 insertable into any one of a row of apertures 55 along the shaft, a guide runner 56 pivotally mounted by a vertical pin 58 for lateral movement on the free end of the shaft, and a pedal unit 60 fixed transversely on the guide runner. Guide runner 56 carries a pair of blades 62 in downwardly diverging side-by-side relationship, the running edge 64 of each blade 62 being laterally concave, as seen in FIG. 2. Pedal unit 60 consists of a cross-arm 66 fixed to guide runner 56 with a pair of foot rests 68 each hinged on a horizontal pivot pin 70 on the upper end of an angle bracket 72 pivotally mounted at the end of cross-arm 66 by a vertical pin 73.

A brake 74 is pivotally mounted on shaft 50 between carriage 10 and guide runner 56. Brake 74 comprises a bar 76 pivotally mounted in a vertical slot 78 in shaft 50 by a horizontally disposed pivot pin 80. The upper end of bar 76 projecting above shaft 50 terminates in a gripping handle 82 and the lower end of the bar projecting below shaft 50 terminates in a toothed scraper 84 urged upwardly towards the shaft by a tension coil spring 86 interconnecting the bar and the shaft.

In the operation of the example embodiment a person sits in seat 30 of carriage 10 with his feet resting on foot rests 68. Motor 44 is operated by control lever 36 and on-off switch 37. Before starting, the position of foot rests 68 may be adjusted by moving shaft 50 along channel 52 and engaging bolt 54 in a suitable aperture 55. When the vehicle is moving, pushed by propeller unit 12, it is steered by foot pressure on one or the other of foot rests 68 which pivots guide runner 56 laterally about pin 58. Foot rests 68 are mounted for universal pivoting about pivot pins 70 and 73 for flexibility. To brake the vehicle when in motion, the operator pulls upward on handle 82 of brake 74 which moves scraper 84 into the plane of the running surface to grip the ice. Spring 86 retracts scraper 84 upwardly when not in use.

The collapse the vehicle for transportation, shaft 50 is withdrawn from channel 52 by removing bolt 54, motor 44 is detached from stand 46 by removing bolts 45, and back rest 28 is lifted away from deck 16 and side walls 24 which allows the side walls to be folded inwardly and downwardly as seen in FIG. 3, the side walls being shaped to avoid stand 46 (or the stand being detachable from deck 16). For further dismantling, pivot pin 58 may be made removable to separate guide runner 56 from shaft 50.

I claim:

1. An ice vehicle comprising:
   a carriage having runner means;
   motor driven propeller means mounted on the carriage; and
   steering means mounted on the carriage and extending forwardly therefrom, said steering means comprising a forwardly extending shaft, a guide runner pivotally mounted on said shaft for lateral pivotal movement and having a transversely extending cross-arm carrying a pair of foot rests, one foot rest being positioned on each side of the guide runner for lateral pivotal movement therewith, each foot rest being universally pivotally mounted on the cross-arm.

2. An ice vehicle as claimed in claim 1 including braking means mounted on the shaft, said braking means comprising a bar pivotally mounted on the shaft for movement in a vertical plane, a handle on one end of the bar above the shaft, and a serrated scraper on the other end of the bar below the shaft.

3. An ice vehicle as claimed in claim 1 in which the propeller means and the steering means are separately detachable from the carriage.

4. An ice vehicle as claimed in claim 3 in which the carriage comprises a deck, a pair of inwardly collapsible sides, and a removable back rest engagable with the sides forwardly of the propeller means to support the sides in an upright position.

5. An ice vehicle as claimed in claim 1 in which the shaft of the steering means is slidably mounted on the carriage, and means for locking the shaft in any selected one of a plurality of positions on the carriage.

6. An ice vehicle as claimed in claim 1 in which the guide runner carries a pair of blades in downwardly diverging, side-by-side relationship.

7. An ice vehicle comprising:
   a carriage having a deck, a pair of spaced runners extending downward from the deck, a pair of inwardly collapsible sides extending upward from the deck, and a removable back rest engagable with the sides to support the sides in an upright position and to form with the sides and the deck a forwardly directed seat;

motor driven propeller means removably mounted on the deck of the carriage behind the seat; and steering means mounted on the carriage and comprising a shaft removably mounted on the carriage and extending forwardly therefrom, a guide runner mounted on the forward end of the shaft for lateral pivotal movement, and a pair of foot rests mounted on the guide runner one on each side of the shaft.

8. An ice vehicle as claimed in claim 7 in which the foot rests are each universally pivotally mounted on the guide runner.

9. An ice vehicle as claimed in claim 7 including downwardly movable braking means pivotably mounted on the shaft.

10. An ice vehicle as claimed in claim 7 in which braking means comprises an upwardly directed bar carrying a handle at the upper end and a horizontally disposed serrated scraper at the lower end, and means to urge the scraper into a raised position.

11. An ice vehicle as claimed in claim 7 in which the guide runner carries a pair of blades in downwardly diverging relationship.

* * * * *